United States Patent [19]

Koot

[11] Patent Number: 4,666,187
[45] Date of Patent: May 19, 1987

[54] DEVICE FOR CONNECTING AND DISCONNECTING HOSES OR PIPES TO AND FROM DIFFICULTLY ACCESSIBLE STRUCTURES

[75] Inventor: Petrus C. Koot, Voorschoten, Netherlands

[73] Assignee: Ingenieursbureau Marcon (Marine Consultants) B.V., Netherlands

[21] Appl. No.: 840,752

[22] Filed: Mar. 18, 1986

[30] Foreign Application Priority Data

Mar. 22, 1985 [NL] Netherlands ............. 8500857

[51] Int. Cl.$^4$ ............................ F16L 55/00
[52] U.S. Cl. .............................. 285/24; 285/27; 285/39; 474/139; 474/150; 474/156
[58] Field of Search ............. 285/18, 24, 27, 39; 474/139, 150, 156

[56] References Cited

U.S. PATENT DOCUMENTS 2,989,880  6/1961  Hesser et al.
3,353,847 11/1967  Brown
3,892,140  7/1975  Fox et al.
4,019,334  4/1977  Sinclair et al. ............ 285/18 X
4,102,146  7/1978  Dietrich
4,371,291  2/1983  Morrill et al.
4,487,434 12/1984  Roche ........................ 285/912 X

FOREIGN PATENT DOCUMENTS 1563151 4/1969 France
2312718 5/1975 France

*Primary Examiner*—Richard J. Scanlan, Jr.
*Attorney, Agent, or Firm*—Wegner & Bretschneider

[57] ABSTRACT

In a device for connecting and disconnecting hoses or pipes to and from difficultly accessible structures such as under water, it is aimed at providing a reliable device, which will be easy to operate, lends itself to repeated connecting and disconnecting of the hoses or pipes, also if necessary by remote control, and which is to a considerable extent selfcleaning. To this end the device has a movable supporting structure for carrying the hose or tube by engaging a freely rotatable end part thereon and an endless chain slung around a driving pinion and around two other chain pinions in the device, which latter pinions are positioned one to each side of the hose or pipe, are movable towards and away therefrom and are urged away therefrom. The chain is slung around part of the periphery of said part to engage a gear ring thereon with its run between the said two other chain pinions. The structure thereby is not sensitive to fouling and to strict dimensional tolerances as more resistance when rotating the end part of the hose or sleeve will bring the said two chain pinions closer thereto and will make the chain tend to engage deeper into the holes between the teeth of the gear ring on the hose or sleeve.

12 Claims, 6 Drawing Figures

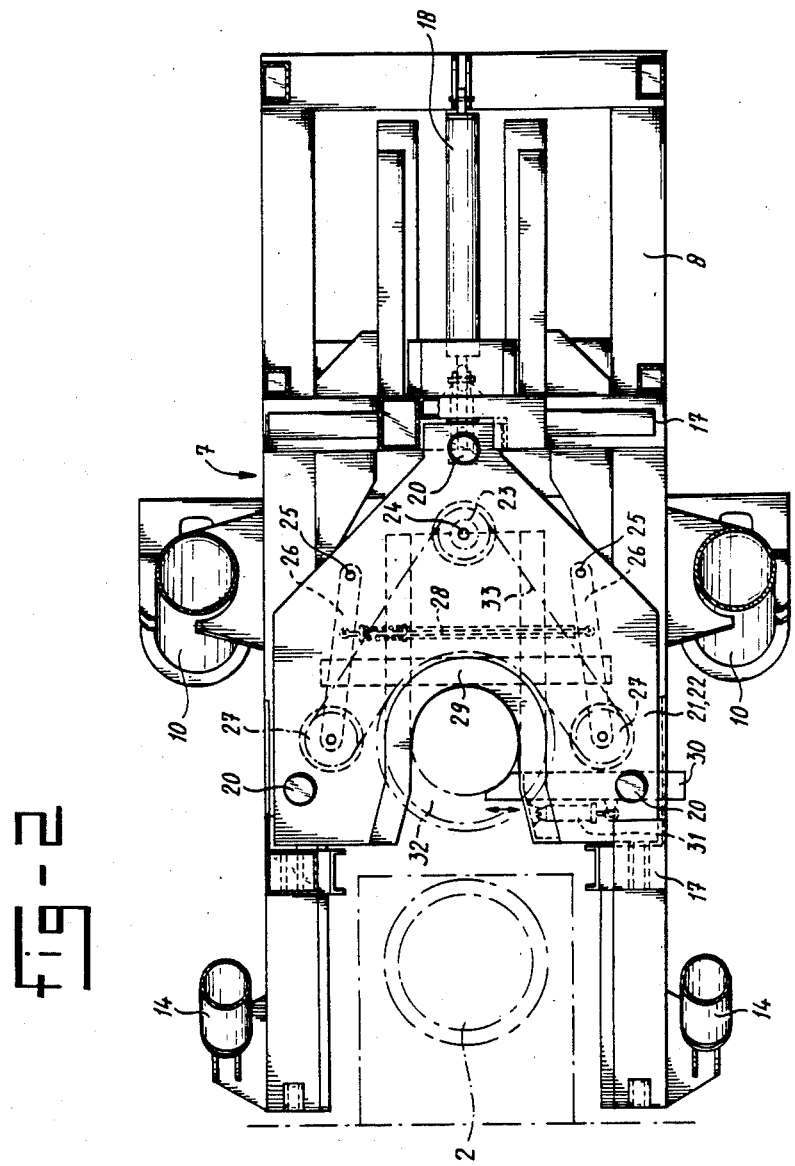

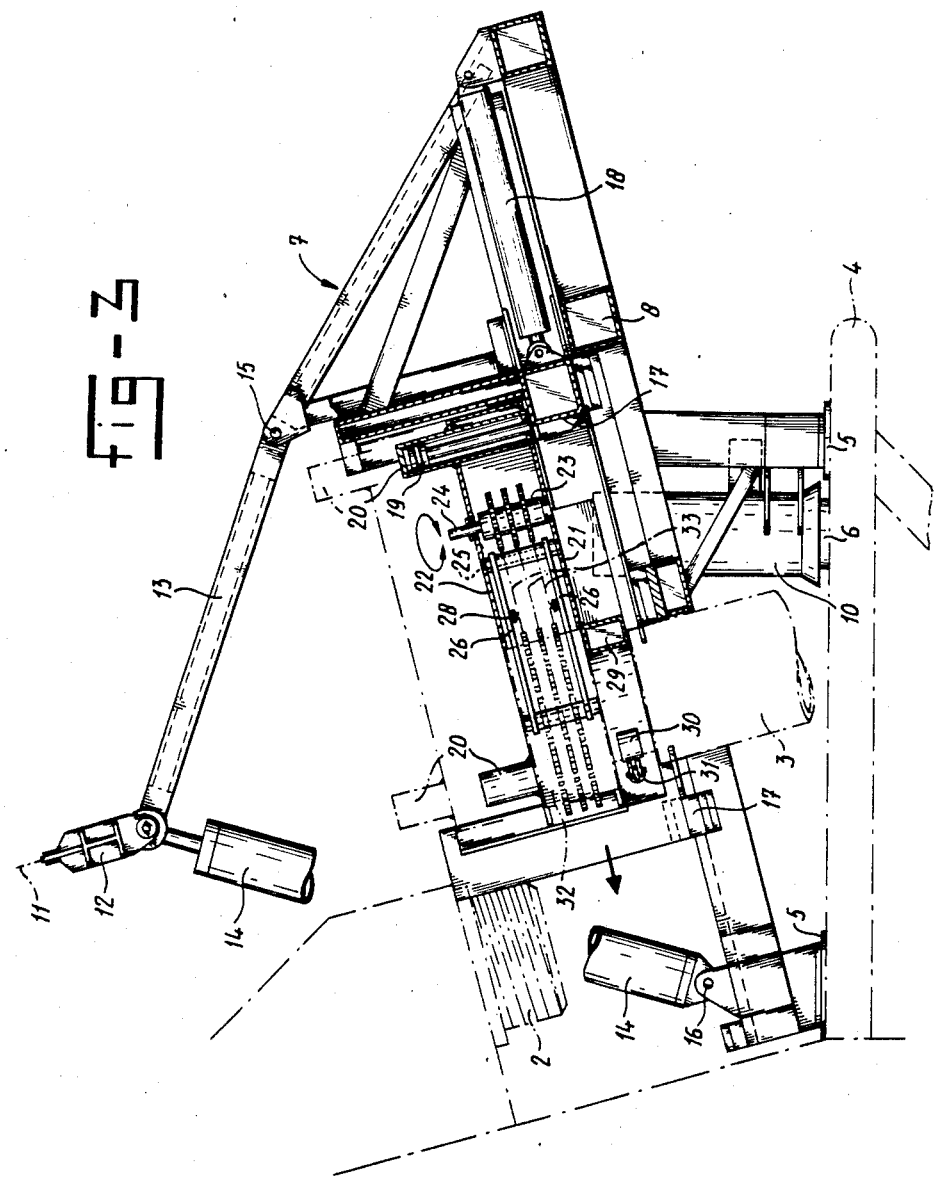

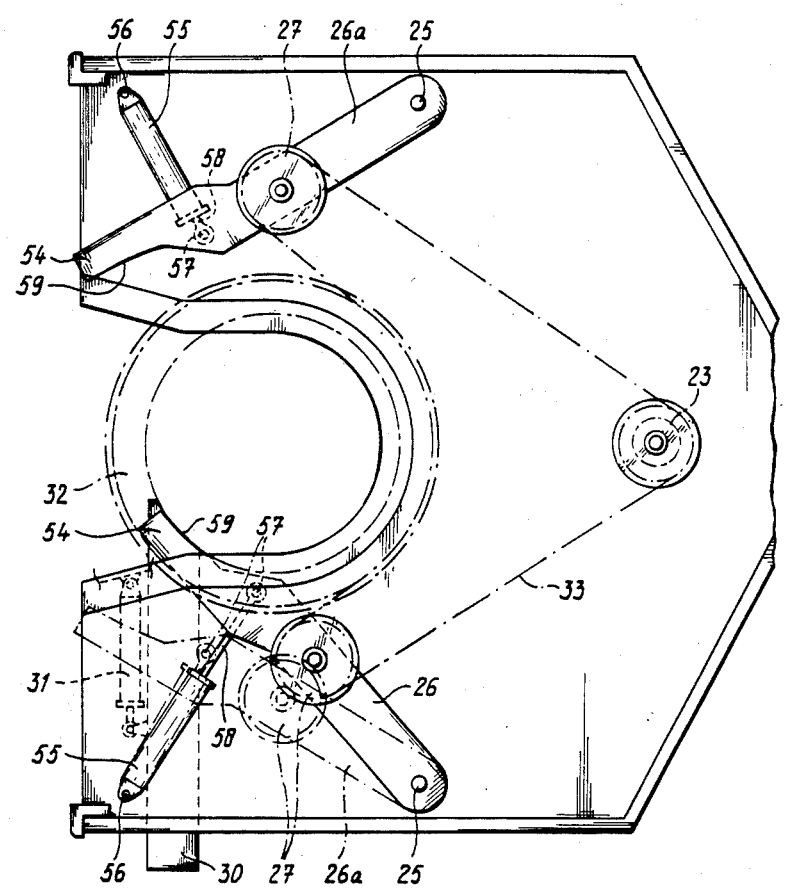

DEVICE FOR CONNECTING AND DISCONNECTING HOSES OR PIPES TO AND FROM DIFFICULTLY ACCESSIBLE STRUCTURES

The invention relates to a device for connecting and disconnecting hoses or pipes to and from difficultly accessible structures, for example under water, in which the hoses or pipes to be coupled have a coupling sleeve, hose or pipe attachment or the like which is freely rotatable thereon.

Many such coupling means are known, but none of them can be used easily and reliably in places which are difficult to reach, for example under water.

The object of the invention is to produce such a device which does not have this disadvantage, which is as simple as possible in design and which is very suitable for remote control from a more readily accessible place, so that particularly connections which have to be frequently disconnected lend themselves for connection and disconnection with a device according to the invention, with as simple a design as possible of the coupling sleeve or the like on the hose or pipe. The object is also to design the device in such a way that soiling, fouling etc. hamper the drive for making the connection as little as possible and are even substantially removed by said device, as will be described below.

To this end, a device of the type referred to in the preamble is characterized according to the invention in that said device has a movable supporting structure for the hoses or pipes to be coupled, with an endless drive chain passing round a driving pinion and round two pinions, one on each side of the hose or pipe carried by the supporting structure, said two pinions being movable towards and away from said hose or pipe, and being sprung back therefrom, while the chain with the outside of the part between said two pinions is adapted to engage with a gear ring on the coupling sleeve, attachment or the like on the hose or pipe carried by the supporting structure.

The invention is intended in the first place to be used in those cases where the connection is a screw thread connection, but it is also suitable for bayonet connections and the like.

The invention also relates to a further development of this principle and of the design of the supporting structure and also means on the structure to which the hose or pipe has to be coupled.

The invention will now be explained in greater detail with reference to the attached drawings, in which:

FIG. 2 is a top view of this coupling device on a larger scale, omitting and horizontally intersecting a number of upright parts;

FIG. 3 is a side view and vertical section thereof, along the axis of the view shown in FIG. 2;

FIG. 5 is a partial top view of the coupling device on a larger scale than that of FIG. 2 and in another embodiment.

Figure 1:
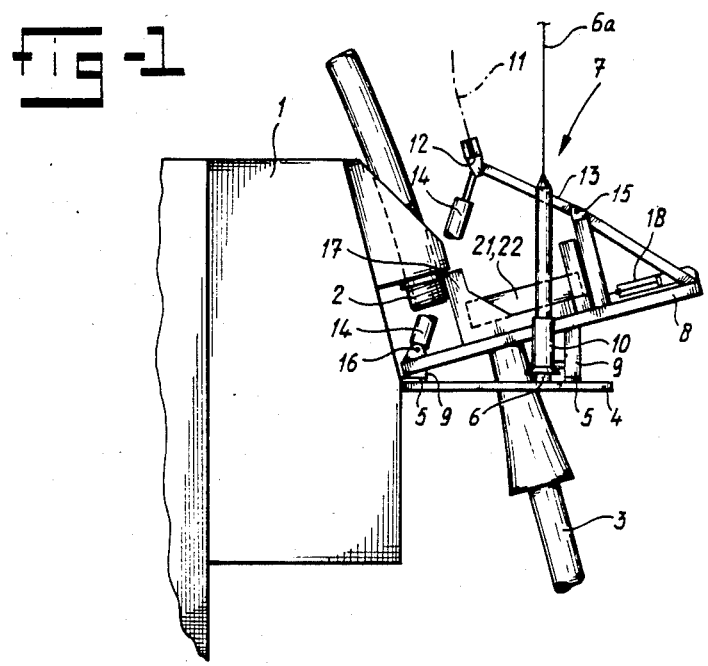
FIG. 1 is a somewhat schematic horizontal view of a coupling device according to the invention with adjoining parts of an underwater structure such as a fixed or floating platform, an underwater collection and/or distribution station, or a riser for oil or gas production.

FIG. 1 shows an underwater structure 1, for example part of a column standing vertically in the water, which can rest hingedly on the seabed or is moored in suspension, can take pipes for carrying, for example, oil or gas and in addition can have floating and ballast tanks, signal cables and electrical, hydraulic and pneumatic lines for power feed to moving parts. At 2 there is thereon a connecting nipple for a pipe or hose 3, said connecting nipple going onto a pipe in the riser 1. Disposed on a platform 4 are four supporting faces 5 and two upright guide pins 6. A row or crown of such connecting nipples 2 can be provided along or round the riser or the like at the same or at different levels thereon.

A supporting structure 7 has on a frame 8 feet 9 and two opposite guide bushes 10. The feet 9 fit on the supporting faces 5 and the bushes 10 fit round the guide pins 6 on platform 4. The pins 6 can have cables 6a, around which the bushes 10 are disposed at or above sea level in order to guide the structure 7 upwards and downwards. The supporting structure is connected to a cable or chain 11 from which is suspended a horizontal beam 12 which at the ends is provided with hingeing carrier bars 13 and hydraulic cylinders 14. The bars 13 engage on the other side with hinge points 15 and the cylinders with hinge points 16 on the frame 8. Guided on and along this frame is a slide 17 for movement along it from right to left, shown in FIGS. 1-3, and moved therein by a hydraulic cylinder 18. Said slide carries three upright piston rods, each with a piston 19 on the top end. A cylinder 20 grips round each piston 19 in sealing fashion, and these cylinders are fixed to a table 21, in this case designed as a partially sealed cabinet with upper wall 22. This cabinet carries between said walls a drive chain pinion 23 with driving means (not shown), for example a hydraulic motor, on its shaft end 24 projecting upwards therefrom. Supported between the walls 21 and 22 are also two hinge pins 25, each having thereon two connected arms 26 one above the other, which at their free ends carry a reversing chain pinion 27 between them (FIG. 2). Provided between said sets of arms 26, hingedly connected thereto at the ends, is an extensible and shortenable bar 28 (or two such bars one above the other), having a spring for pressing apart said arms, shown in FIG. 2. Instead of such a spring, one or more hydraulic or pneumatic cylinders which are flexibly actuated—and thus act like springs—can engage with the arms.

In this case the chain pinions 23 and 27 are designed each with three chain gear ring one above the other, suitable for working together with an endless triplex chain 33. Instead of such a chain, toothed belts, for example, can be used. The spring in bar 28 keeps the chain 33 taut all the time.

The plates 21 and 22 have a U-shaped recess with a circular bottom, clearly seen in FIG. 2, and below the plate 21 is a carrier element, in this case a rectangular sheath 29 welded thereto which follows the shape of said recess, but bounds a smaller opening along the entire length. A lock 30 which is insertable lengthwise into said sheath and, if desired, guided into a projecting part thereof, can be moved by means of a hydraulic cylinder 31 to and fro lengthwise in order to project into the opening inside the sheath 29 or be withdrawn from said opening.

A hose 3 has a coupling sleeve or attachment 32 which is disposed rotatably on the end thereof and has an internal screw thread and three external gear rings 53 thereon (FIG. 6), and the connecting nipple 2 on the riser 1 has external screw thread, so that said hose can be coupled thereto and uncoupled therefrom by turning the sleeve or attachment 32. If the hose is not symmetrical on all sides, but is, for example, a multichannel hose which has to be connected precisely in a particular angular position to the connecting nipple 2, the hose can have a lug (not shown) which slots into a recess in sheath 29 or fits against or between lugs thereon in order to establish a good angular position.

All kinds of details of the device which must or can be present, or are customary, but are of little importance for a good understanding of the invention, have not been shown in the drawings. This includes pipes for the feed of hydraulic and if necessary pneumatic medium, signal, controlling and such means, underwater television cameras etc.

This device works as follows: A hose 3 with attachment or coupling sleeve 32 is inserted into the U-shaped recess of the table 21, 22, in the position indicated by dotted and dashed lines in FIG. 3. This can take place at any suitable point, for example on the deck of a working ship. The lock 30 is operated here in such a way that it first allows the hose through during fitting and then retains it. On cable 11 the device 7 is now lowered with the bushes 10 round cables 6a until it stands with its feet 9 on the supporting faces 5 on the riser or the like. Through extension or shortening of the cylinders 14, this can be carried out in such a way that the frame already hangs near enough to that position before this setting down is completed, so that the bushes 10 are also in the correct position to grip on and around the guide pins 6.

After this positioning, the table 21, 22 is moved in such a way (arrow in FIG. 3) by cylinder 18 that the coupling sleeve or attachment 32 comes to rest with its axis precisely in the axis of the connecting nipple 2, a position which can be determined by stops or is obtained by control, for example by means of television while operating cylinder 18.

By actuation of the cylinders 20, the table 21, 22 with the hose is raised and at the same time the pinion 23 is caused to rotate. The cylinders are actuated flexibly, so that they are subjected to an upward pressure, but are not forced to a particular position at a particular time or to a particular speed of motion. Depending on the engagement of the screw thread in coupling sleeve or attachment 32 with the screw thread on connecting nipple 2, the table 21, 22 thus moves upwards until the coupling is made. Then cylinder 18 is actuated in the opposite direction after lock 30 has been withdrawn, so that the table 21, 22 with the chain 33 etc. is removed from the hose connection. The device 7 can then be removed in its entirety on cable 11 and used in a different place. The cylinders 14 can be actuated here in such a way that said removal is flexible, through the fact that the device will not change position much, despite the fact that the hose 3 is no longer suspended from the device and the centre of gravity is shifted considerably.

The typical structure with the hinged arms 26 on which the pinions 27 are disposed is a great advantage for this rough and heavy operation. The coupling sleeves 32 of the hoses tend to soil through caking up and fouling, and here it is a particular disadvantage that the spaces between the teeth can become filled up. On the other hand, it is difficult to keep the chain very taut. The structure indicated now works as follows: where the chain 33 pulls on the gear rings on coupling sleeve 32, a greater force—thus also a greater degree of fouling which the chain will press out of the crown gears—will swing the arm 26 on the pulling side towards the coupling sleeve. This is a clear consequence of the angle difference between the resultant of the forces in the chain parts on either side of the pinion 27 and the direction of arm 26. The chain therefore pulls itself faster into the teeth of the coupling sleeve to compensate for such fouling. The structure and the chain length need not thereby meet very precise tolerances.

It will be clear that this effect also occurs if the hinge points 25 coincide, also for example if they should coincide with the shaft of drive pinion 23, provided that the said resultant forms an angle with the arm 26 in question in order to cause the arm 26 to swing when the magnitude of said resultant changes. A position of the arms 26 such as that shown does, however, give a great effect in the said direction. If necessary, stops are provided in order to limit the swing of the arms 26, if desired both inwards and outwards.

Figure 4:
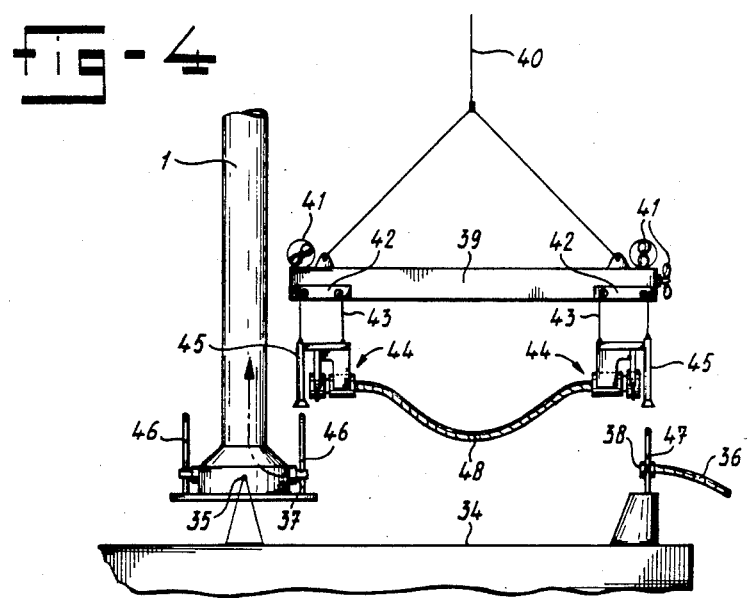
FIG. 4 is a schematic horizontal view of such a coupling device with adjoining parts of an underwater structure in another embodiment.

FIG. 4 shows schematically a different connection device. Here it is assumed that resting on the seabed is a platform 34 which is connected to the riser 1 in a cardan construction 35. Hoses or pipes 36 run over the seabed and can lead to all kinds of desired connections for any desired prupose. A device according to the invention is now used here in order to connect connections such as hose nipples 37 on the riser, for example for pipes conducted upwards therein, to connections such as hose nipples 38 on the hoses or pipes 36. A frame 39 on cable 40 here has screws 41 in order to be positioned dynamically and remain so, and two trolleys 42 which may be movable in frame 39 and have cables 43, each bearing a connecting device 44. The latter have guide bushes 45 to place on guide pins 46 and 47 (preferably of unequal lengths) on riser and platform respectively. A hose 48 extends between the connecting devices 44.

The detailed design of the connecting devices can be the same as that in the embodiments of FIGS. 1 to 3, with the difference that the sleeve and hose axis runs horizontally and thus the drive chain 33 and the arms 26 etc. are in vertical planes. In the case of this application, wherein the positioning movement in front of the devices 44 is vertical with a horizontal hose connection axis, a separate table sliding over a frame, such as the parts 21, 22 and 8 in the previous embodiment, can be omitted if with the cable 40 or with the cables 43 the axes of the parts to be connected can be aligned sufficiently accurately.

FIG. 5 shows a structure very similar to that of FIGS. 2 and 3, but the arms 26 of the chain pinions 27 here form an angle with each other which is in the opposite direction to the angle of the chain parts running from drive pinion 23. Past those pinions 27, said arms 26 here have an extension piece 54 which on the side facing the coupling sleeve or attachment 32 of the pipe to be coupled or uncoupled has a flat part 59 which fits behind said coupling sleeve or attachment. Disposed here, instead of the sprung bar(s) 28 of FIGS. 2 and 3, are hydraulic cylinders 55, hinged at 56, at 57 with their piston rods hingedly engaging with the arms 26 and hydraulically actuated in such a way that they try to move the arms 26 outwards with spring action away from the hose or pipe. On the drive side the chain forces pull the arm 26 in question against the attachment or coupling sleeve 32 of the hose or pipe, as shown by solid lines. Without drive, the cylinder in question removes its arm 26 again from the hose or pipe, as shown for the bottom arm by a dotted and dashed line in FIG. 5, and on reversal of the drive chain pulls the other arm 26 against said attachment or coupling sleeve. In this way said attachment or coupling sleeve is properly locked, and the component of the driving power which is to press said attachment or coupling sleeve from the table is well taken up. It remains advisable here to retain the lock 30 for locking the hose or pipe when no driving is taking place.

Figure 6:
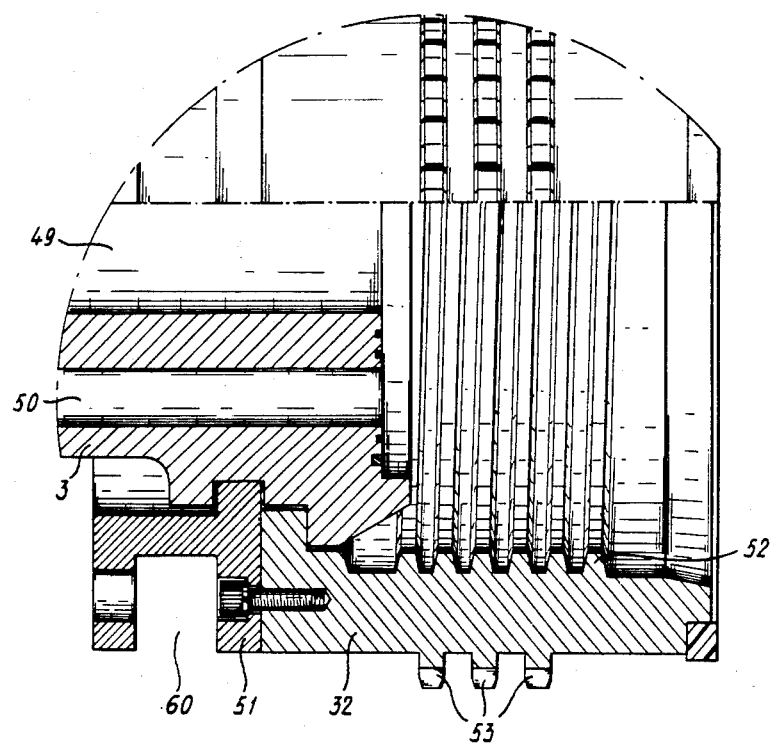
FIG. 6 is a partial cross section and view of the end of a hose with coupling sleeve for use in the device according to one of the preceding figures.

FIG. 6 shows one end of a hose 3 where the invention can be applied. It has a central channel 49 and outside it a number of channels 50 which are for carrying various media and can be used for media for various purposes. The fixed connecting nipple 2 with which such a hose has to be coupled has the same channels. A coupling sleeve 32 is disposed rotatably on the hose by a divided U-shaped flange 51 fixed with bolts on the sleeve. The sleeve 32 has internal screw thread 52, corresponding to the external screw thread on the fixed connecting nipple 2, and on the outside face three gear rings 53 to work in conjunction with the chain 33 which has been described. The recess 60 between the legs of the flange 51 can accommodate the sheath 29 of the table 21, 22 with the flange legs on either side thereof for good positioning of the hose axially relative to said table.

If desired, the pinions 27 can be carried not by hingeing arms 26, but in guides which make it possible for them to slide to and from the hose or pipe to be coupled or uncoupled with springs or the like to push them away, but the embodiment with such hingeing arms seems to be more reliable.

Of course, instead of connecting nipples 2, coupling sleeves can be disposed on the rigid structure, while the hose or pipe to be connected thereto has a nipple engaging therewith which is rotatable relative to the pipe or hose, as is also known per se.

I claim:

1. A device for coupling and uncoupling hoses or pipes to and from difficultly accessible structures in which the hoses or pipes to be coupled have a coupling means for freely rotating thereon, said device has a movable supporting structure for the hoses or pipes to be coupled, with an endless drive chain passing round a driving pinion and round two pinions, one on each side of the hose or pipe carried by the supporting structure, said two pinions being movable towards and away from said hose or pipe, and have means for urging said pinions away from said hose and pipe, while the chain with the outside of the run between said two pinions is adapted to engage with a gear ring on the coupling means on the hose or pipe carried by the supporting structure.

2. A device according to claim 1, wherein said two pinions are disposed on arms hingedly connected with the supporting structure.

3. A device according to claim 2, wherein said arms are hingedly connected with the supporting structure at points which make the arms together form a smaller angle in the same direction.

4. A device according to claim 3, wherein said arms on the side of the chain have means for gripping behind a part of said hose or pipe to support the hose or pipe vertical to its longitudinal direction.

5. A device according to claim 1, wherein the movable supporting structure has means for positioning it near the connection point and engaging means carried by a basic structure thereof and movable relative thereto for gripping the sleeve or the like of the hose or pipe and retaining it both in the longitudinal direction of the hose or pipe and in a plane perpendicular thereto and by movement of said engaging means relative to said basic structure taking it to the correct position in front of the connection point or removing it therefrom, wherein the chain and the drive means therefor are thus movable with the engaging means relative to said basic structure in order to make said sleeve or the like move axially and to follow its axial movement in driving and supporting fashion during making and breaking of the connection.

6. A device according to claim 5, wherein the engaging and drive means for said coupling sleeve or the like are disposed on a table, carried by the basic structure and movable relative thereto perpendicular and parallel to the axis of said coupling sleeve or the like.

7. A device according to claim 6, wherein provision is made between the table and said basic structure for a slide which can be moved essentially only in its own plane relative to the basic structure, and in which said slide carries the table and takes it along during said movement and has one or more jacks approximately perpendicular thereto for moving the table relative to said slide.

8. A device according to claim 5, wherein the supporting structure has at least two search and positioning heads, by means of which it can be positioned from the top by an essentially vertical downward movement, by gripping round or engaging with parts of complementary shape on the structure to which the hoses or pipes have to be connected.

9. A device according to claim 5, which has a suspension structure to be lowered to a desired point, said suspension structure having on a cable or chain a three-point or four-point suspension from the device, at least one arm of which has means for extension or shortening by remote control, in such a way that the engaging and drive means can be taken quickly into and held in the position in which their direction of movement is perpendicular to the axis of the connection to which or from which the hose or pipe gripped by the engaging means has to be coupled or uncoupled.

10. A structure with at least one for connecting means for detachably connecting hose or pipe to a device according to claim 8 wherein said structure has supporting means for said device near said connecting means with search and positioning parts, complementary to such parts on said device.

11. A device according to claim 2, wherein said arms are hingedly connected with the supporting structure at points which make the arms together form a smaller angle in the opposite direction than the chain parts from the driving pinion towards said two pinions.

12. A device according to claim 1, wherein said sleeve has an external chain gear ring.

* * * * *